US006582810B2

(12) United States Patent
Heffelfinger

(10) Patent No.: US 6,582,810 B2
(45) Date of Patent: Jun. 24, 2003

(54) ONE-STEP METHOD OF PRODUCING AN ELASTIC, BREATHABLE FILM STRUCTURE

(75) Inventor: Michael T. Heffelfinger, Alpharetta, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 201 days.

(21) Appl. No.: 09/748,704

(22) Filed: Dec. 22, 2000

(65) Prior Publication Data

US 2002/0081423 A1 Jun. 27, 2002

(51) Int. Cl.$^7$ .......................... B32B 27/12; B32B 27/14
(52) U.S. Cl. ............................... 428/297.4; 428/300.7; 428/304.4; 428/317.9; 442/381; 442/382; 442/398; 604/367
(58) Field of Search .................... 428/297.4, 300.7, 428/304.4, 317.9; 442/381, 382, 398; 604/367

(56) References Cited

U.S. PATENT DOCUMENTS

| | | | |
|---|---|---|---|
| 3,338,992 A | 8/1967 | Kinney | 264/441 |
| 3,341,394 A | 9/1967 | Kinney | 442/366 |
| 3,502,538 A | 3/1970 | Petersen | 428/359 |
| 3,502,763 A | 3/1970 | Hartmann | 264/555 |
| 3,542,615 A | 11/1970 | Dobo et al. | 156/181 |
| 3,692,618 A | 9/1972 | Dorschner et al. | 442/401 |
| 3,802,817 A | 4/1974 | Matsuki et al. | 425/66 |
| 3,832,267 A | 8/1974 | Liu | 428/167 |
| 4,100,324 A | 7/1978 | Anderson et al. | 442/344 |
| 4,197,148 A | 4/1980 | Shinomura | 156/79 |
| 4,340,563 A | 7/1982 | Appel et al. | 264/518 |
| 4,640,859 A | 2/1987 | Hansen et al. | 428/105 |
| 4,704,116 A | 11/1987 | Enloe | 604/385.27 |
| 4,753,649 A | 6/1988 | Pazdernik | 604/389 |
| 4,777,073 A | 10/1988 | Sheth | 428/155 |
| 4,798,603 A | 1/1989 | Meyer et al. | 604/378 |
| 4,814,124 A | 3/1989 | Aoyama et al. | 264/41 |
| 4,818,464 A | 4/1989 | Lau | 264/510 |
| 4,833,172 A | 5/1989 | Schwarz et al. | 521/62 |
| 5,022,990 A | 6/1991 | Doi et al. | 210/500.42 |
| 5,064,802 A | 11/1991 | Stevens et al. | 502/155 |
| 5,176,953 A | 1/1993 | Jacoby et al. | 428/315.5 |
| 5,204,429 A | 4/1993 | Kaminsky et al. | 526/308 |
| 5,364,382 A | 11/1994 | Latimer et al. | 604/378 |
| 5,374,696 A | 12/1994 | Rosen et al. | 526/126 |
| 5,429,629 A | 7/1995 | Latimer et al. | 604/378 |
| 5,451,450 A | 9/1995 | Erderly et al. | 428/220 |
| 5,472,775 A | 12/1995 | Obijeski et al. | 428/220 |
| 5,490,846 A | 2/1996 | Ellis et al. | 604/366 |
| 5,539,124 A | 7/1996 | Etherton et al. | 548/402 |
| 5,554,775 A | 9/1996 | Krishnamurti et al. | 216/65 |
| 5,733,628 A | * 3/1998 | Pelkie | 428/138 |
| 5,800,758 A | 9/1998 | Topolkaraev et al. | 264/154 |
| 5,879,343 A | 3/1999 | Dodge, II et al. | 604/378 |
| 5,882,518 A | 3/1999 | Yagi et al. | 210/500.36 |
| 5,910,136 A | 6/1999 | Hetzler et al. | 604/367 |
| 5,955,187 A | 9/1999 | McCormack et al. | 428/315.5 |
| 5,968,643 A | 10/1999 | Topolkaraev et al. | 428/305.5 |
| 6,013,151 A | 1/2000 | Wu et al. | 156/229 |
| 6,075,179 A | 6/2000 | McCormack et al. | 604/367 |
| 6,096,014 A | 8/2000 | Haffner et al. | 604/367 |
| 6,096,668 A | 8/2000 | Abuto et al. | 442/328 |
| 6,111,163 A | 8/2000 | McCormack et al. | 604/367 |

FOREIGN PATENT DOCUMENTS

| | | |
|---|---|---|
| EP | 0 330 716 A2 | 9/1989 |
| WO | WO 98/29479 | 7/1998 |
| WO | WO 99/14262 | 3/1999 |

* cited by examiner

*Primary Examiner*—Terrell Morris
*Assistant Examiner*—John J. Guarriello
(74) *Attorney, Agent, or Firm*—Pauley Petersen Kinne & Erickson

(57) ABSTRACT

A one-step method of imparting breathability and elasticity to a film includes coextruding elastic fibers within a matrix of a filled, semi-rigid film structure. Once the elastic fibers are within the film structure, the film can be stretched to impart breathability, while the elastic fibers provide elasticity. Furthermore, the elastic fibers can include an absorbent material. The resulting breathable, elastic film is particularly useful in diapers and other personal care products.

25 Claims, 4 Drawing Sheets

ONE-STEP METHOD OF PRODUCING AN ELASTIC, BREATHABLE FILM STRUCTURE

FIELD OF THE INVENTION

This invention is directed to a method of delivering breathability and elasticity to a film in one step while making the film.

BACKGROUND OF THE INVENTION

Breathable materials, such as breathable films, typically block the passage of particulate matter, water and other liquids while allowing water vapor and air to pass through the material. Thus, breathable materials are particularly suitable for use in garments and personal care products, thereby allowing moisture trapped beneath the fabric to escape as water vapor.

One example of a breathable material is a microporous film. This type of film is typically filled with particles or other matter and then crushed or stretched to form a fine pore network of micropores of a size and/or frequency to impart the desired level of breathability to the fabric.

Elasticity is another material attribute that is desirable in garments and personal care products. For example, in pant-like garments, machine direction elasticity is desirable because longitudinal conformability prevents a crotch region of the garment from sagging and bulging. Similarly, cross direction elasticity is desirable because lateral conformability maintains a snug, yet comfortable fit about a wearer's hips. Furthermore, when elasticity is incorporated within the garment material, the need for adding elastic components to a product can be eliminated.

Materials that are both breathable and elastomeric can be formed by laminating a breathable layer with an elastomeric layer. However, breathable laminates are often not breathable enough, thereby resulting in excess vapor retention within the garment, personal care product, or other application made of the breathable laminate.

Another method of forming breathable, elastic materials is to include inorganic filler within an elastic/semi-rigid polymeric matrix, stretching to micro-void, thus gaining both breathability and elasticity. However, achieving a proper polymeric matrix blend is difficult, yet necessary, in order to obtain the desired balance of properties of breathability, extensibility, and retraction, along with other property improvements.

Yet another method of forming breathable, elastic materials includes aligning thin fibers of stretched elastic material along a spunbonded sheet, bonding the fibers to the sheet and then releasing the composite. However, this process can be time-consuming and expensive.

There is a need or desire for a cost-efficient, time-efficient method of producing elastic, breathable films.

SUMMARY OF THE INVENTION

The present invention is directed to a method of delivering breathability and elasticity to a film in one step during the extrusion/stretching process of making the film. The one-step method includes coextruding thin elastic fibers within the matrix of a filled, semi-rigid film structure and stretching the film structure to form micro-voids to gain breathability, while the elastic fibers within the film structure provide elasticity.

Various embodiments of the invention include the use of mono-axial stretching, along with bi-axial stretching. Also, the elastic fibers can be aligned in a machine direction pattern to create machine direction elasticity, and/or can be aligned in a cross direction pattern to create cross direction elasticity. Furthermore, absorptive characteristics can be added to the elastic fiber material to enhance the absorptive characteristics of the resulting film structure.

The resulting film structure can deliver breathability, expressed as water vapor transmission rate (WVTR), in a range of about 500 to 30,000 grams/$m^2$-24 hours using the Mocon WVTR test procedure described below. The resulting film structure is particularly useful in diapers and other personal care products.

With the foregoing in mind, it is a feature and advantage of the invention to provide an efficient, low-cost method of delivering breathability and elasticity to a film during the film-making process.

The foregoing and other features and advantages of the invention will become further apparent from the following detailed description of the presently preferred embodiments, read in conjunction with the examples and drawings.

DEFINITIONS

Figure 1:
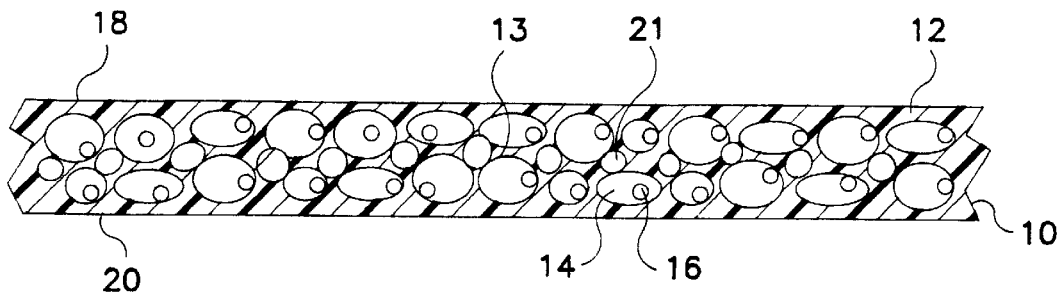
FIG. 1 is a cross-sectional view of a single-layer breathable, elastic film of the invention.

Within the context of this specification, each term or phrase below will include the following meaning or meanings.

"Bonded" refers to the joining, adhering, connecting, attaching, or the like, of two elements. Two elements will be considered to be bonded together when they are bonded directly to one another or indirectly to one another, such as when each is directly bonded to intermediate elements.

"Elastic," "elastomeric," "elasticized" and "elasticity" refer to a material or composite which can be elongated by at least 50 percent of its relaxed length and which will recover, upon release of the applied force, at least 40 percent of its elongation. It is generally preferred that the elastic material or composite be capable of being elongated by at least 100 percent, more preferably by at least 300 percent, of its relaxed length and recover, upon release of an applied force, at least 50 percent of its elongation.

"Elastic fiber" includes elastic bands, strands, ribbons, composites, filaments, filament bunches and the like.

"Film" refers to a thermoplastic film made using a film extrusion and/or foaming process, such as a cast film or blown film extrusion process. For the purposes of the present invention, the term includes breathable microporous films that act as liquid barriers.

"Layer" when used in the singular can have the dual meaning of a single element or a plurality of elements.

"Meltblown fiber" means fibers formed by extruding a molten thermoplastic material through a plurality of fine, usually circular, die capillaries as molten threads or filaments into converging high velocity heated gas (e.g., air) streams which attenuate the filaments of molten thermoplastic material to reduce their diameter, which may be to microfiber diameter. Thereafter the meltblown fibers carried by the high velocity gas stream are deposited on a collecting surface to form a web of randomly dispersed meltblown fibers. Such a process is disclosed for example, in U.S. Pat. No. 3,849,241 to Butin et al. Meltblown fibers are microfibers which may be continuous or discontinuous, are generally smaller than about 0.6 denier, and are generally self bonding when deposited onto a collecting surface. Meltblown fibers used in the present invention are preferably substantially continuous in length.

"Nonwoven" and "nonwoven web" refer to fibrous materials and webs of fibrous material which are formed without the aid of a textile weaving or knitting process.

"Polymers" include, but are not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configurations of the molecules. These configurations include, but are not limited to isotactic, syndiotactic and atactic symmetries.

"Spunbonded fiber" refers to small diameter fibers which are formed by extruding molten thermoplastic material as filaments from a plurality of fine capillaries of a spinnerette having a circular or other configuration, with the diameter of the extruded filaments then being rapidly reduced as described, for example, in U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartmann, U.S. Pat. No. 3,502,538 to Petersen, and U.S. Pat. No. 3,542,615 to Dobo et al., each of which is incorporated herein in its entirety by reference. Spunbond fibers are quenched and generally are not tacky when they are deposited onto a collecting surface. Spunbond fibers are generally continuous and often have average deniers larger than about 0.3, more particularly, between about 0.6 and 10.

"Superabsorbent" or "superabsorbent material" refers to a water-swellable, water-insoluble organic or inorganic material capable, under the most favorable conditions, of absorbing at least about 15 times its weight and, more desirably, at least about 30 times its weight of an aqueous solution containing 0.9 weight percent sodium chloride. The superabsorbent materials can be natural, synthetic and modified natural polymers and materials. In addition, the superabsorbent materials can be inorganic materials, such as silica gels, or organic compounds such as cross-linked polymers.

"Thermoplastic" describes a material that softens when exposed to heat and which substantially returns to a non-softened condition when cooled to room temperature.

These terms may be defined with additional language in the remaining portions of the specification.

DETAILED DESCRIPTION OF THE PRESENTLY PREFERRED EMBODIMENTS

The present invention is directed to a one-step method of imparting breathability and elasticity to a film. The resulting breathable, elastic film is particularly suitable for use in disposable absorbent articles. Examples of such suitable articles include diapers, training pants, incontinence products, swim wear, other personal care or health care garments, or the like.

Referring to FIG. 1, a breathable monolayer film 10 is shown including a matrix 12, a plurality of voids 14 within the matrix surrounded by relatively thin microporous membranes 13 defining tortuous paths, and one or more filler particles 16 in each void 14. The film 10 is microporous as well as breathable, and the microporous membranes 13 between the voids readily permit molecular diffusion of water vapor from a first surface 18 to a second surface 20 of the film 10. Also included in the matrix 12 of the film is a number of elastic fibers 21. These elastic fibers 21 are coextruded with the film 10, thus imparting elasticity to the film 10.

The extent of the elasticity of the film 10 is dependent on the elasticity of the elastic fibers 21. Suitably, the film 10 with the elastic fibers 21 embedded therein can stretch between about 50% and 600% in the direction in which the elastic fibers are coextruded with the film, other examples of suitable stretching ranges include between about 70% and 550%, or between about 100% and 5000% of its relaxed length and can recover, upon release of an applied force, at least 50 percent of its elongation. The film 10 is tailorable, such that desired levels of stretch and recovery can be achieved through the use of certain polymers. For example, a polymer having a high level of stretch and recovery can be combined with a polymer having a lower level or stretch and recovery to create a film having a level of stretch and recovery between the combined polymers.

The breathability of the film 10, expressed as water vapor transmission rate (WVTR), is a function of both film thickness and film composition. The film 10 suitably can deliver moderate breathability, expressed as WVTR, in a range of about 500 to 30,000 grams/m$^2$-24 hours using the Mocon WVTR test procedure described below. Suitably, the moderate WVTR of the film is at least about 500 grams/m$^2$-24 hours, even more suitably at least about 750 grams/m$^2$-24 hours, most suitably at least about 1000 grams/m$^2$-24 hours. After the elastic fibers 21 are coextruded within the film 10, the film can be stretched to impart breathability to the film, as described in greater detail below.

The polymer matrix 12 can be formed from any suitable film-forming thermoplastic polymer. Examples of suitable polymers include without limitation polyethylene, polypropylene, copolymers of mainly ethylene and $C_3$–$C_{12}$ alpha-olefins (commonly known as linear low density polyethylene), copolymers of mainly propylene with ethylene and/or $C_4$–$C_{12}$ alpha-olefins, and flexible polyolefins including propylene-based polymers having both atactic and isotactic propylene groups in the main polypropylene chain. Other suitable matrix polymers include without limitation elastomers, for example polyurethanes, copolyether esters, polyamide polyether block copolymers, ethylene vinyl acetate copolymers, block copolymers having the general formula A-B-A' or A-B such as copoly (styrene/ethylene-butylene), styrene-poly (ethylene-propylene)-styrene, styrene-poly (ethylene-butylene)-styrene, polystyrene/poly (ethylene-butylene)/polystyrene, poly (styrene/ethylene-butylene/styrene), and the like. Exemplary polymers include those made by "metallocene," "constrained geometry" or "single-site" catalysts such as those described in U.S. Pat. No. 5,472,775 to Obijeski, et al. U.S. Pat. No. 5,451,450 to Erderly, et al.; U.S. Pat. No. 5,204,429 to Kaminsky, et al.; U.S. Pat. No. 5,539,124 to Etherton, et al.; and U.S. Pat. No. 5,554,775 to Krishnamurti, et al.; each of which is hereby incorporated by reference.

Metallocene catalyzed polymers are described in U.S. Pat. No. 5,472,775 to Obijeski et al. and assigned to the Dow Chemical Company, the entire contents of which are incorporated herein by reference. The metallocene process generally uses a metallocene catalyst which is activated, i.e. ionized, by a co-catalyst. Examples of metallocene catalysts include bis(n-butylcyclopentadienyl)titanium dichloride, bis(n-butylcyclopentadienyl)zirconium dichloride, bis(cyclopentadienyl)scandium chloride, bis(indenyl)zirconium dichloride, bis(methylcyclopentadienyl)titanium dichloride, bis(methylcyclopentadienyl)zirconium dichloride, cobaltocene, cyclopentadienyltitanium trichloride, ferrocene, hafnocene dichloride, isopropyl (cyclopentadienyl,-1-flourenyl)zirconium dichloride, molybdocene dichloride, nickelocene, niobocene dichloride, ruthenocene, titanocene dichloride, zirconocene chloride hydride, zirconocene dichloride, among others. A more exhaustive list of such compounds is included in U.S. Pat. No. 5,374,696 to Rosen et al. and assigned to the Dow Chemical Company. Such compounds are also discussed in U.S. Pat. No. 5,064,802 to Stevens et al. and also assigned to Dow. However, numerous other metallocene, single-site and/or similar catalyst systems are known in the art; see for example, U.S. Pat. No. 5,539,124 to Etherton et al.; U.S. Pat. No. 5,554,775 to Krishnamurti et al.; U.S. Pat. No. 5,451,450 to Erderly et al. and *The Encyclopedia of Chemical Technology*, Kirk-Othemer, Fourth Edition, vol. 17, Olefinic Polymers, pp. 765–767 (John Wiley & Sons 1996); the entire content of the aforesaid patents being incorporated herein by reference.

The matrix polymer may constitute about 30–95% by weight of the breathable monolayer film 10 (or, in the case of multilayer films described below, that percent of each filled film layer). When the film (after stretching, as described below) is desired to have excellent strength and moderate breathability, the matrix polymer may constitute about 55–95% by weight of the breathable film or film layer, suitably about 60–80% by weight of the breathable film or film layer. In this embodiment, the filler particles 16 may constitute about 5–45% of the breathable film or film layer, suitably about 20–40% by weight. When the film (after stretching) is desired to have superior breathability and moderate strength, the breathable film or film layer may include about 30% to less than 55% by weight of the matrix polymer, suitably about 35–50% by weight; and more than 45% to about 70% by weight of the particulate filler, suitably about 50–65% by weight.

The filler particles 16 may be inorganic filler particles. Suitable inorganic fillers include without limitation calcium carbonate, clays, silica, alumina, barium sulfate, sodium carbonate, talc, magnesium sulfate, titanium dioxide, zeolites, aluminum sulfate, diatomaceous earth, magnesium sulfate, magnesium carbonate, barium carbonate, kaolin, mica, carbon, calcium oxide, magnesium oxide, aluminum hydroxide and combinations of these particles. The mean diameter for the filler particles 16 should range from about 0.1–10 microns, preferably about 0.5–7.0 microns, most preferably about 0.8–2.0 microns.

The filler particles 16 may also be organic filler particles. Examples of organic filler particles that may be used include particles made of polystyrene, polyamides, polyvinyl alcohol, polyethylene oxide, polyethylene terephthalate, polybutylene terephthalate, polycarbonate, polytetrafluoroethylene, and other suitable polymers and derivatives thereof.

The filler particles 16 may be water-swellable filler particles. As an example, films including water-swellable filler particles are described in U.S. Pat. No. 5,955,187, hereby incorporated by reference.

The filler particles 16 may be cavated filler particles including, for example, cyclodextrin. As an example, films including cavated filler particles are described in U.S. Patent Application entitled "Breathable Barrier Films Containing Cavated Fillers" filed Dec. 7, 2000.

The elastic fibers 21 are preferably substantially continuous in length, i.e., have a length which approximates the corresponding dimension of the film, and are substantially embedded in the film. The elastic fibers 21 have a range of fiber sizes for a throughput range of 3.0–7.2 grams per hole per minute (ghm), 0.0069–0.0107 inch (about 7 to 11 thousandths of an inch), using a 0.031 inch hole in a die plate puts the fiber draw between 2.9 and 4.4. The elastic fibers 21 can be arranged in a machine direction pattern within the film, thereby providing machine direction elasticity, or in a cross direction pattern to provide cross direction elasticity, or in both a machine direction pattern and a cross direction pattern to provide biaxial elasticity.

Figure 4:
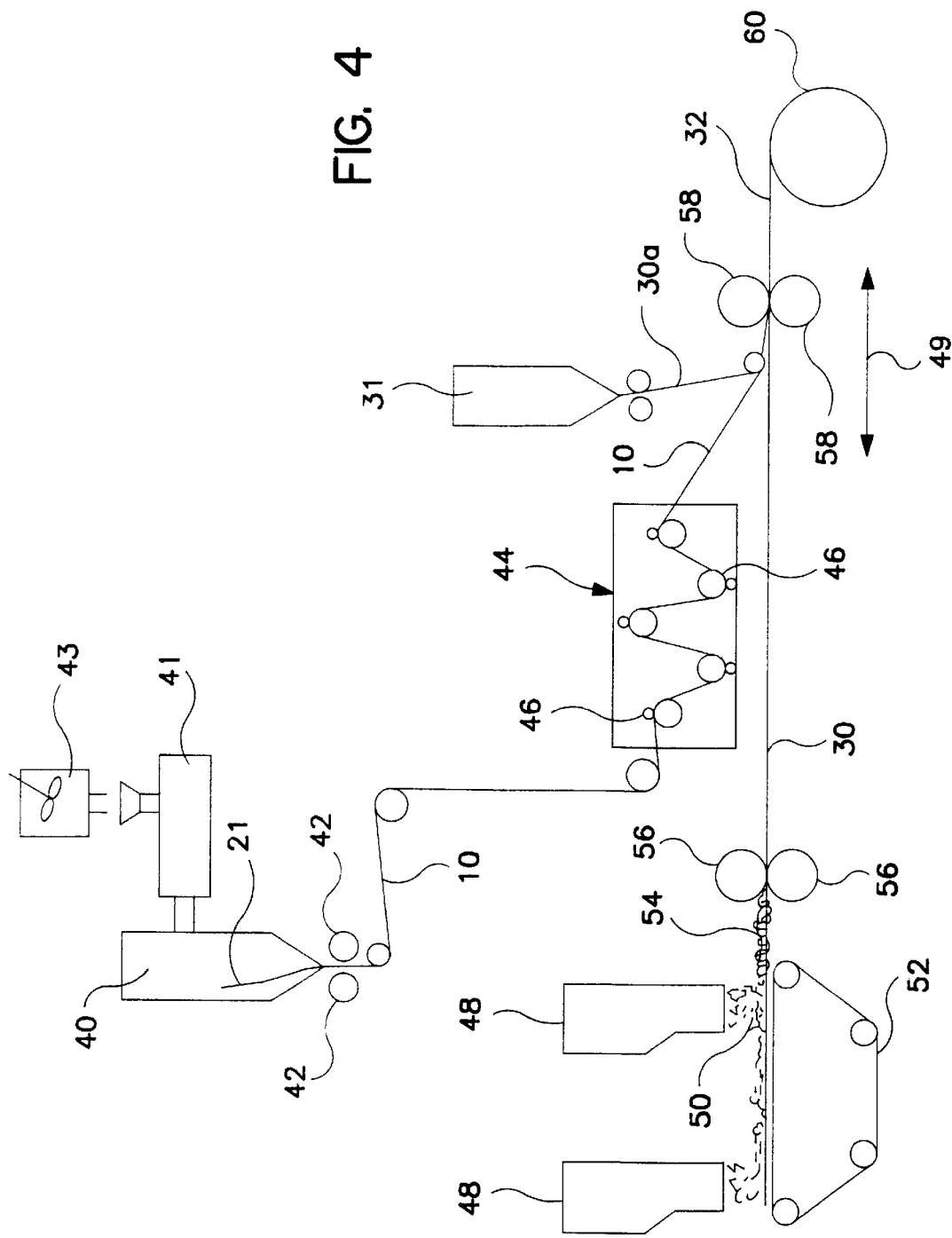
FIG. 4 is a schematic diagram of a process for making a breathable, elastic film.

The term "cross direction," as used herein, refers to the width of a material in a direction generally perpendicular to the direction in which it is produced, as opposed to "machine direction," which refers to the length of a material in the direction in which it is produced. For reference, arrow 49 depicts the machine direction in FIG. 4, while the cross direction in FIG. 4 is essentially perpendicular to the plane of the figure thereby extending into and out of the page.

The elastic fibers can include diblock, triblock, tetrablock or other multi-block elastomeric copolymers such as olefinic copolymers, including styrene-isoprene-styrene, styrene-butadiene-styrene, styrene-ethylene/butylene-styrene, or styrene-ethylene/propylene-styrene, which may be obtained from Kraton Polymers in Houston, Tex., under the trade designation KRATON® elastomeric resin; polyurethanes, including those available from E. I. Du Pont de Nemours Co., under the trade name LYCRA® polyurethane; polyamides, including polyether block amides available from Ato Chemical Company, under the trade name PEBAX® polyether block amide; polyesters, such as those available from E. I. Du Pont de Nemours Co., under the trade name HYTREL® polyester; and single-site or metallocene-catalyzed polyolefins such as those available from Dow Chemical Co.

A number of block copolymers can be used to prepare the elastic fibers. Such block copolymers generally include an elastomeric midblock portion B and a thermoplastic endblock portion A. The block copolymers may also be thermoplastic in the sense that they can be melted, formed, and resolidified several times with little or no change in physical properties (assuming a minimum of oxidative degradation).

Endblock portion A may comprise a poly(vinylarene), such as polystyrene. Midblock portion B may comprise a substantially amorphous polyolefin such as polyisoprene, ethylene/propylene polymers, ethylene/butylene polymers, polybutadiene, and the like, or mixtures thereof.

Other suitable elastomeric polymers may also be used to make the elastic fibers. These include, without limitation, elastomeric (single-site or metallocene catalyzed) polypropylene, polyethylene and other alpha-olefin homopolymers and copolymers, having density less than about 0.89 grams/cc; ethylene vinyl acetate copolymers; and substantially amorphous copolymers and terpolymers of ethylene-propylene, butene-propylene, and ethylene-propylene-butene. Single-site catalyzed (e.g. metallocene-catalyzed and constrained geometry) elastomeric polymers are presently preferred.

In order to add absorptive characteristics to the film, absorbent material can be combined with the elastic fibers. For example, the elastic fibers can suitably be combined with hydrophilic fibers, such as cellulosic fluff, and the cellulosic fluff may be mixed with particles of a high-absorbency material commonly known as superabsorbent material. In a particular embodiment, the elastic fibers are combined with cellulosic fluff, such as wood pulp fluff, and synthetic fibers. Another type of absorbent material suitable for combining with the elastic fibers is coform, which is a blend of short fibers and melt-blown fibers. Wood pulp fibers are preferred for the short fibers and polypropylene is preferred for the melt-blown fibers. Other short fibers such as short cut polypropylene, polyester, nylon, and the like may be substituted for part of or all of the wood pulp fibers. Superabsorbent materials may be added to the coform to increase absorbent capacity. The absorptive characteristics can be useful after the film has been elongated. More specifically, the breathable film allows water vapor to pass through, thus the water vapor may condense within the film and become trapped therein by the absorbent material in the elastic fibers.

Suitable superabsorbent materials can be selected from natural, synthetic, and modified natural polymers and materials. The superabsorbent materials can be inorganic materials, such as silica gels, or organic compounds, such as crosslinked polymers. Suitable superabsorbent materials are available from various commercial vendors, such as Dow Chemical Company located in Midland, Mich., U.S.A., and Stockhausen GmbH & Co. KG, D-47805 Krefeld, Federal Republic of Germany. Typically, a superabsorbent material is capable of absorbing at least about 15 times its weight in water, and desirably is capable of absorbing more than about 25 times its weight in water.

To impart breathability, the film may be uniaxially or biaxially stretched. The film may be uniaxially stretched to about 1.1–7.0 times its original length, preferably to about 1.5–6.0 times its original length, most preferably to about 2.5–5.0 times its original length. The film may alternatively be biaxially stretched by the same ratios, using conventional techniques familiar to persons skilled in the art. The stretching should occur below the melting temperature of the polymer matrix, desirably about 15–50° F. below the melting point of the polymer matrix.

The breathable, elastic film 10 should have a thickness which facilitates breathability to water vapor, and which also permits structural integrity and liquid barrier. After stretching, the film 10 should have a thickness of about 5–50 microns, preferably about 8–30 microns, most preferably about 10–20 microns. Prior to the orientation, the film 10 can be prepared using cast or blown film extrusion, or another suitable film-forming technique.

Figure 2:
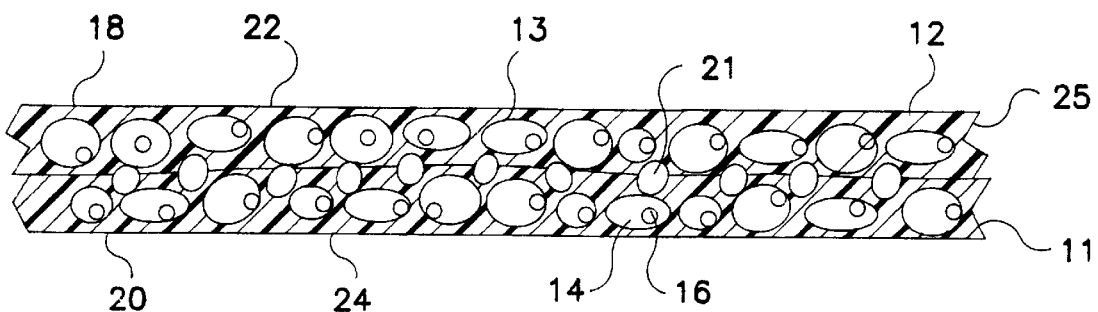
FIG. 2 is a cross-sectional view of a two-layer breathable, elastic film of the invention.

FIG. 2 illustrates another embodiment in which a multilayer breathable, elastic film 11 includes the elastic fibers 21 coextruded between two breathable layers 22 and 24, wherein the elastic fibers are embedded substantially continuously along the length of the film. The two breathable layers 22, 24 may have the same or a similar polymer composition to the monolayer film 10 described with respect to FIG. 1.

Figure 3:
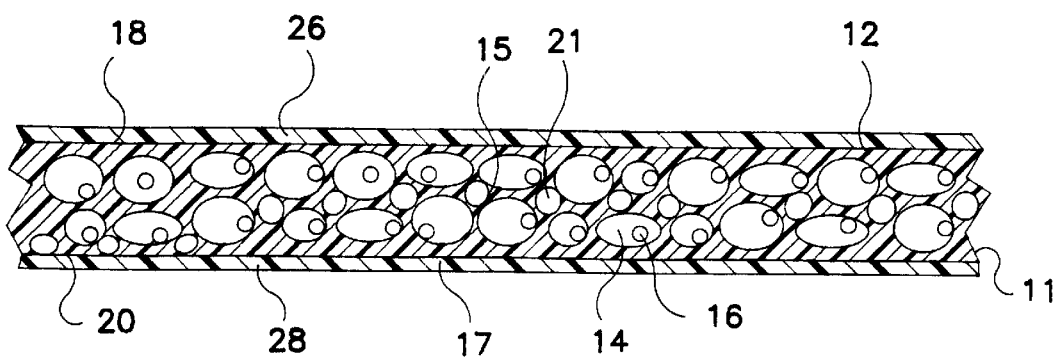
FIG. 3 is a cross-sectional view of a three-layer breathable, elastic film of the invention.

FIG. 3 illustrates yet another embodiment in which a multilayer breathable, elastic film 11 includes a primary breathable, elastic core layer 15 coextruded between two outer skin layers 26 and 28. The core layer 15 includes polymer matrix 12, and cavated filler particles 16 surrounded by voids 14 with elastic fibers 21 coextruded with the core layer 15. The first outer skin layer 26 includes only a thermoplastic polymer, and is free of filler particles and voids. The second outer skin layer 28 includes a polymer matrix 17, and filler particles 16 surrounded by voids 14 within the matrix 17. Alternatively, the elastic fibers 21 can be placed between the core layer 15 and one or both skin layers 26, 28, rather than being coextruded within the core layer 15.

The multilayer film 11 in FIG. 3 illustrates that the outer skin layers 26 and 28 may or may not contain a filler. The core layer 15 may have the same or a similar polymer composition to the monolayer film 10 described with respect to FIG. 1. The outer layers 26 and 28 may contain a softer, lower melting polymer or polymer blend which renders the outer layers more suitable as heat seal bonding layers for thermally bonding the film to a nonwoven web. When the outer layer (e.g., 26) is free of filler, one objective is to alleviate the build-up of filler at the extrusion die lip which may otherwise result from extrusion of a filled monolayer film. When the outer layer (e.g., 28) contains filler particles and voids, one objective is to provide a suitable bonding layer without adversely affecting the overall breathability of the film 11. Multi-layer films and skin layers are described in more detail in U.S. Pat. No. 6,075,179 issued to McCormack et al. and is hereby incorporated by reference.

The thickness and composition of the outer layers 26 and 28 should be selected so as not to substantially impair the moisture transmission through the breathable core layer 15. This way, the breathable core layer 15 may determine the breathability of the entire film, and the outer layers will not substantially reduce or block the breathability of the film. To this end, the skin layers 26 and 28 should be less than about 10 microns thick, suitably less than about 5 microns thick, desirably less than about 2.5 microns thick. Suitable skin layer polymers include without limitation ethylene vinyl acetates, propylene vinyl acetates, ethylene methyl acrylates, polystyrene polyamides, other vapor-permeable polymers, and blends of these with each other and with other polyolefins.

Regardless of whether the breathable, elastic film is a monolayer film or a multilayer film, the overall film should be constructed to function as a breathable microporous film. To function properly, the overall film should have a water vapor transmission rate (WVTR) of at least about 500 grams/m$^2$-24 hours measured using the Mocon procedure described below. Suitably, the overall film should have an WVTR of at least about 1000 grams/m$^2$-24 hours.

FIG. 4 illustrates an integrated process for forming a breathable, elastic film. Referring to FIG. 4, film 10 is formed from a film extrusion apparatus 40 such as a cast or blown unit which could be in-line or off-line. Typically the apparatus 40 will include an extruder 41. Filled resin, including the polymer matrix material, and particulate filler, is prepared in a mixer 43 and directed to extruder 41. The film 10 is extruded into a pair of nip or chill rollers 42, one of which may be patterned so as to impart an embossed pattern to the newly formed film 10. While the film 10 is extruded into the nip or chill rollers 42, the elastic fibers 21 are simultaneously coextruded within the matrix of the film 10, such that the elastic fibers 21 are substantially buried within the film core, desirably completely buried within the film core. The nip or chill rollers 42 can apply an amount of stress and progressively stretch the elastic fibers so that the elastic fibers are in a stretched position as they are coextruded with the film resin.

From the film extrusion apparatus 40 or off-line rolls supplied, the filled film 10 is directed to a film stretching unit 44 which can be a machine direction orienter, commercially available from vendors including the Marshall and Williams Co. of Providence, R.I. The stretching unit 44 includes a plurality of pairs of stretching rollers 46, with each subsequent pair moving at a progressively faster speed than the preceding pair. The rollers 46 apply an amount of stress and progressively stretch the filled film 10 to a stretched length where the film 10 becomes microporous and breathable. As shown, the film 10 is stretched only in the machine direction, which is the direction of travel of the film 10 through the process in FIG. 4.

Advantageously, the film 10 may be uniaxially stretched to about three times its original length, using an elevated stretch temperature of about 150–200° F. for most polyolefin-based films. The elevated stretch temperature can be sustained by heating some of the stretch rollers 46. The optimum stretch temperature varies with the type of matrix polymer in the film 10, and is always below the melting temperature of the matrix polymer. The film 10 may also be biaxially stretched, with the cross-directional stretching occurring before, after or concurrently with the machine direction stretching.

Still referring to FIG. 4, in one particular embodiment of the invention, the film 10 may be laminated to a nonwoven web 30 immediately after the film is stretched and immediately following manufacture of the nonwoven web. The nonwoven web 30 can be a spunbonded web, a meltblown web, a bonded carded web, or combination thereof. The web can be formed by dispensing polymer filaments 50 from a pair of conventional spinnerettes 48, onto a conveyor assembly 52. The filaments 50 are deposited onto the conveyor to form a mat 54. The filaments 50 of mat 54 are then compressed to form inter-filament bonding using a pair of nip rollers 56, resulting in the spunbonded web 30. The spunbonded web 30 is then transported to the calender bonding rollers 58 and is thermally bonded to one side of the film 10.

Figure 5:
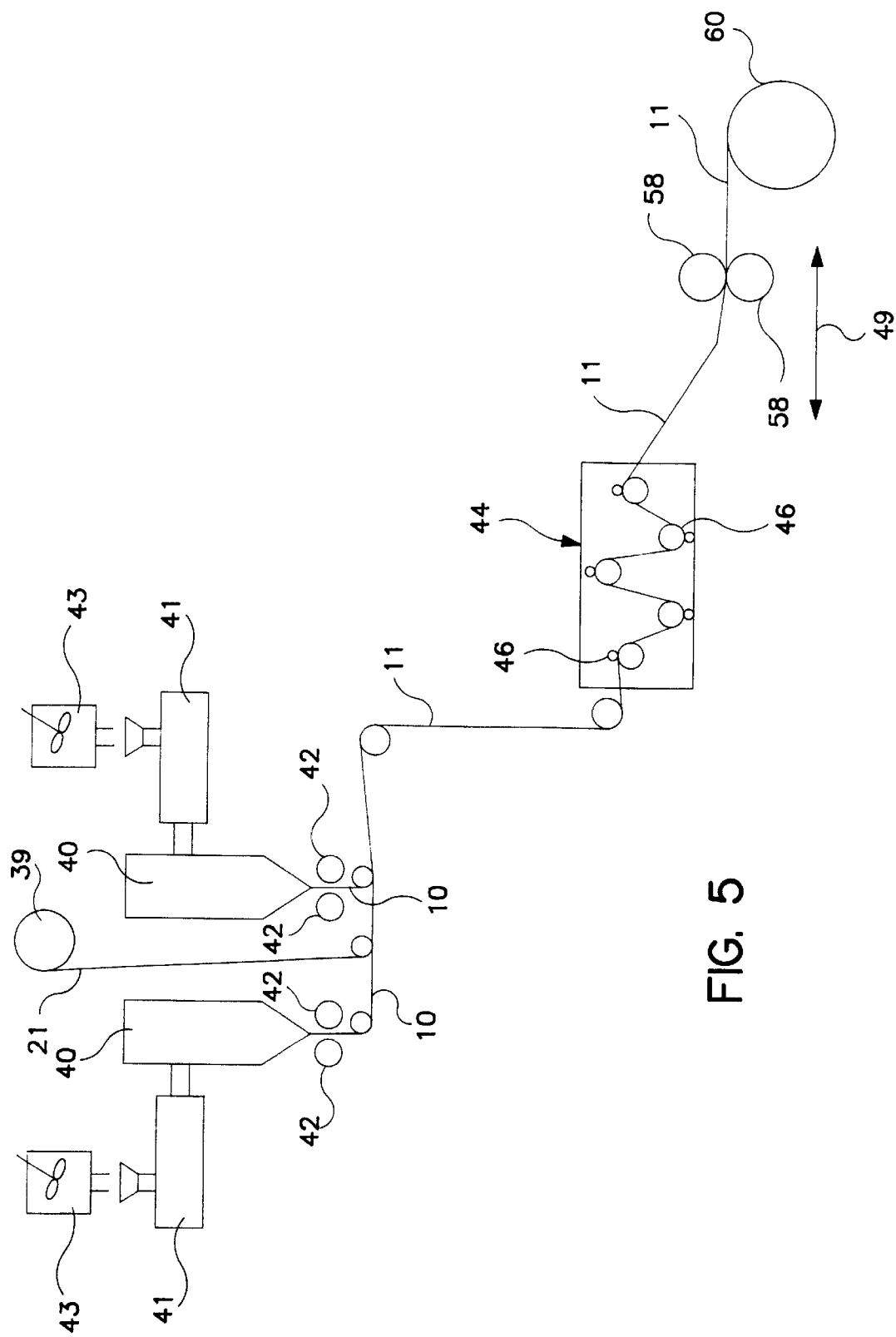
FIG. 5 is a schematic diagram of another embodiment of a process for making a breathable, elastic film.

To make a multilayer film 11, such as the film 11 shown in FIG. 2, the elastic fibers 21 can be extruded from a supply roll 39 between two separate layers of film 10, as shown in FIG. 5. Alternatively, a multilayer film 11 can be formed, as shown in FIG. 4, by simultaneously bonding the film 10 on the side on which the elastic fibers are coextruded to a second film layer 30a originating from a similar film extrusion apparatus 31. The resulting multilayer film 11 or laminate 32 is wound and stored onto a supply roll 60.

Figure 6:
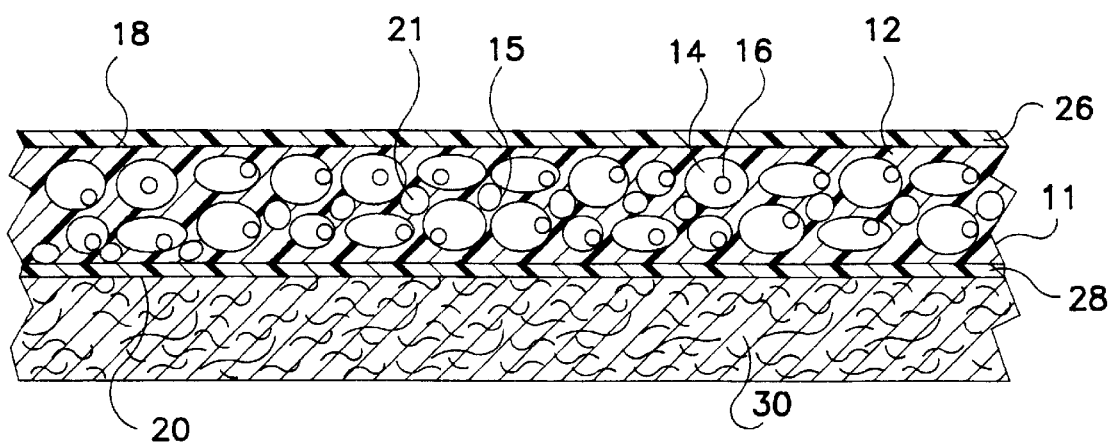
FIG. 6 is a cross-sectional view of a laminate including the breathable, elastic film of the invention.

The breathable film may be laminated to one or more fibrous nonwoven substrates, such as a spunbond web, meltblown web, or airlaid web, using conventional adhesive bonding or thermal bonding techniques known in the art. The type of substrate and bonding will vary depending on the particular end use application. An example of a laminate is shown in FIG. 6, wherein a nonwoven web 30 is laminated to a multi-layer breathable, elastic film 11 of the invention. In the embodiment shown, the web 30, which can be a spunbonded web, is bonded to a voided skin layer 28 of the multilayer film 11, which layer may contain particulate filler particles. The primary filler-containing layer 15 faces away from the nonwoven web 30. The lamination of the film to the nonwoven web may be accomplished using conventional thermal bonding or adhesive bonding techniques. The fibrous nonwoven web may be made from any of the polymers listed above for the breathable, elastic film. In particular, the spunbond web may be made from a suitable polyolefin (e.g., polyethylene or polypropylene), or another thermoplastic polymer.

The breathable, elastic film and/or laminate containing it may be used in a wide variety of personal care absorbent articles and medical products. The term "personal care absorbent products" includes without limitation diapers, training pants, swim wear, absorbent underpants, baby wipes, adult incontinence products and feminine hygiene products. The term "medical products" includes without limitation medical garments, aprons, underpads, bandages, drapes and wipes.

Personal care articles generally include a liquid permeable topsheet, which faces the wearer, and a liquid-impermeable bottom sheet or outer cover. Disposed between the topsheet and outer cover is an absorbent core, often the topsheet and outer cover are sealed to encase the absorbent core. Personal care articles may be of various shapes such as, for example, an overall rectangular shape, T-shape or an hourglass shape. The baffle or outer cover may comprise a breathable liquid-impervious film and/or a laminate thereof such as described herein. The topsheet is generally coextensive with the outer cover but may optionally cover an area that is larger or smaller than the area of the outer cover, as desired. By way of example only, exemplary personal care articles and components thereof are described in U.S. Pat. No. 4,798,603 to Meyer et al., U.S. Pat. No. 4,753,649 to Pazdernick, U.S. Pat. No. 4,704,116 to Enloe, U.S. Pat. No. 5,429,629 to Latimer et al.; the entire contents of each of the aforesaid references are incorporated herein by reference.

The topsheet preferably presents a body-facing surface that is compliant, soft to the touch, and non-irritating to the wearer's skin. The topsheet is suitably employed to help isolate the wearer's skin from liquids held in the absorbent core. In order to present a dryer surface to the wearer, the topsheet may be less hydrophilic than the absorbent core and also sufficiently porous to be readily liquid permeable. Topsheets are well known in the art and may be manufactured from a wide variety of materials, such as porous foams, reticulated foams, apertured plastic films, natural fibers (i.e., wool or cotton fibers), synthetic fibers (i.e., polyester, polypropylene, polyethylene, etc.), or a combination of natural and synthetic fibers. For example, the topsheet can comprise a spunbond fiber web of polyolefin fibers or a bonded-carded web composed of natural and/or synthetic fibers. In this regard the topsheet may be composed of substantially hydrophobic material treated with a surfactant or otherwise processed to impart the desired level of wettability and liquid permeability. Exemplary topsheets are described in U.S. Pat. No. 5,879,343 to Ellis et al.; U.S. Pat. No. 5,490,846 to Ellis et al.; U.S. Pat. No. 5,364,382 to Lattimer et al. and commonly assigned U.S. patent application Ser. No. 09/209,177 filed Dec. 9, 1998 to Varona et al.; the entire contents of each of the aforesaid references are incorporated herein by reference.

Between the breathable liquid-impervious outer cover and the liquid pervious topsheet is positioned an absorbent core which typically includes one or more absorbent materials such as, for example, superabsorbent particles, wood pulp fluff fibers, synthetic weed pulp fibers, synthetic fibers and combinations thereof. Wood pulp fluff, however, commonly lacks sufficient integrity alone and has a tendency to collapse when wet. Thus, it is often advantageous to add a stiffer reinforcing fiber such as polyolefin meltblown fibers or shorter length staple fibers, typically provided as a coform material as described, for example, in U.S. Pat. No. 4,818, 464 to Lau and U.S. Pat. No. 4,100,324 to Anderson et al. The absorbent core may have any of a number of shapes, the size of which will vary with the desired loading capacity, the intended use of the absorbent article and other factors known to those skilled in the art. The various components of the diaper can be integrally assembled together employing various means of attachment known to those skilled in the art such as, for example, adhesive bonding, ultrasonic bonds, thermal bonds or combinations thereof.

It will be appreciated that details of the foregoing embodiments, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention, which is defined in the following claims and all equivalents thereto. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention.

Mocon Test Procedure For Water Vapor Transmission Rate (WVTR)

A suitable technique for determining the WVTR (water vapor transmission rate) value of a film or laminate material of the invention is the test procedure standardized by INDA (Association of the Nonwoven Fabrics Industry), number IST-70.4–99, entitled "STANDARD TEST METHOD FOR WATER VAPOR TRANSMISSION RATE THROUGH NONWOVEN AND PLASTIC FILM USING A GUARD FILM AND VAPOR PRESSURE SENSOR" which is incorporated by reference herein. The INDA procedure provides for the determination of WVTR, the permeance of the film to water vapor and, for homogeneous materials, water vapor permeability coefficient.

The INDA test method is well known and will not be set forth in detail herein. However, the test procedure is summarized as follows. A dry chamber is separated from a wet chamber of known temperature and humidity by a permanent guard film and the sample material to be tested. The purpose of the guard film is to define a definite air gap and to quiet or still the air in the air gap while the air gap is characterized. The dry chamber, guard film, and the wet chamber make up a diffusion cell in which the test film is sealed. The sample holder is known as the Permatran-W Model 100K manufactured by Mocon/Modern Controls, Inc., Minneapolis, Minn. A first test is made of the WVTR of the guard film and the air gap between an evaporator assembly that generates 100% relative humidity. Water vapor diffuses through the air gap and the guard film and then mixes with a dry gas flow which is proportional to water vapor concentration. The electrical signal is routed to a computer for processing. The computer calculates the transmission rate of the air gap and the guard film and stores the value for further use.

The transmission rate of the guard film and air gap is stored in the computer as CalC. The sample material is then sealed in the test cell. Again, water vapor diffuses through the air gap to the guard film and the test material and then mixes with a dry gas flow that sweeps the test material. Also, again, this mixture is carried to the vapor sensor. The computer then calculates the transmission rate of the combination of the air gap, the guard film, and the test material. This information is then used to calculate the transmission rate at which moisture is transmitted through the test material according to the equation:

$$TR^{-1}_{test\ material} = TR^{-1}_{test\ material,\ guardfilm,\ airgap} - TR^{-1}_{guardfilm,\ airgap}$$

Calculations
WVTR: The calculation of the WVTR uses the formula:

$$WVTR = Fp_{sat}(T)RH/Ap_{sat}(T)(1-RH))$$

where:
F=The flow of water vapor in cc/min.,
$P_{sat}(T)$=The density of water in saturated air at temperature T,
RH=The relative humidity at specified locations in the cell,
A=The cross sectional area of the cell, and,
$P_{sat}(T)$=The saturation vapor pressure of water vapor at temperature T.

What is claimed is:

1. A breathable, elastic film comprising a mixture of filler particles, a thermoplastic polymer, and at least one elastic fiber substantially continuously embedded within the thermoplastic polymer and the filler particles, the film having voids formed around the filler particles to facilitate passage of water vapor through the film.

2. The breathable, elastic film of claim 1, wherein the thermoplastic polymer is selected from polyethylene, polypropylene, copolymers of mainly ethylene and $C_3$–$C_{12}$ alpha-olefins, copolymers of mainly propylene with ethylene and $C_4$–$C_{12}$ alpha-olefins, and flexible polyolefins.

3. The breathable, elastic film of claim 1, wherein the filler particles comprise inorganic filler particles.

4. The breathable, elastic film of claim 3, wherein the filler particles comprise calcium carbonate.

5. The breathable, elastic film of claim 1, wherein the filler particles comprise organic filler particles.

6. The breathable, elastic film of claim 1, comprising about 5 to 45% by weight of the filler particles.

7. The breathable, elastic film of claim 1, comprising about 20 to 40% by weight of the filler particles.

8. The breathable, elastic film of claim 1, comprising about 45 to 70% by weight of the filler particles.

9. The breathable, elastic film of claim 1, comprising about 50 to 65% by weight of the filler particles.

10. The breathable, elastic film of claim 1, wherein the at least one elastic fiber comprises an absorbent material.

11. The breathable, elastic film of claim 1, wherein the film has been uniaxially stretched.

12. The breathable, elastic film of claim 1, wherein the film has been biaxially stretched.

13. The breathable, elastic film of claim 1, comprising at least two layers of the thermoplastic polymer, with the at least one elastic fiber coextruded between the two layers.

14. A personal care absorbent product comprising the breathable, elastic film of claim 1.

15. A medical product comprising the breathable, elastic film of claim 1.

16. A breathable, elastic multilayer film comprising:
a primary breathable layer including a mixture of filler particles and a thermoplastic polymer, and having voids formed around the filler particles to facilitate passage of water vapor;
at least one skin layer; and
at least one elastic fiber between the primary breathable layer and the at least one skin layer.

17. The breathable, elastic multilayer film of claim 16, wherein the at least one elastic fiber is coextruded with the primary breathable layer.

18. The breathable, elastic multilayer film of claim 16, wherein the thermoplastic polymer is selected from polyethylene, polypropylene, copolymers of mainly ethylene and $C_3$–$C_{12}$ alpha-olefins, copolymers of mainly propylene with ethylene and $C_4$–$C_{12}$ alpha-olefins, and flexible polyolefins.

19. The breathable, elastic multilayer film of claim 16, wherein the skin layer further comprises filler particles, and has voids formed around the filler particles to facilitate the passage of water vapor.

20. A breathable, elastic laminate, comprising the breathable, elastic film of claim 1, and a fibrous nonwoven web.

21. The breathable, elastic laminate of claim 20, wherein the film and nonwoven web are adhesively bonded together.

22. The breathable, elastic laminate of claim 20, wherein the film and nonwoven web are thermally bonded together.

23. The breathable, elastic laminate of claim 20, wherein the nonwoven web comprises a spunbond web.

24. The breathable, elastic laminate of claim 20, wherein the nonwoven web comprises a meltblown web.

25. The breathable, elastic laminate of claim 20, wherein the nonwoven web comprises an air laid web.

* * * * *

UNITED STATES PATENT AND TRADEMARK OFFICE
CERTIFICATE OF CORRECTION

PATENT NO.     : 6,582,810 B2
DATED          : June 24, 2003
INVENTOR(S)    : Michael T. Heffelfinger It is certified that error appears in the above-identified patent and that said Letters Patent is hereby corrected as shown below:

Column 12,
Line 5, replace the existing equation with the following equation:
-- $WVTR = F\rho_{sat}(T)RH/A\rho_{sat}(T)(1-RH)$ --
Line 9, replace "$P_{sat}(T)$" with -- $\rho_{sat}(T)$ --

Signed and Sealed this

Twelfth Day of October, 2004

JON W. DUDAS
*Director of the United States Patent and Trademark Office*